June 16, 1931.  E. HAMWI  1,809,848
MACHINE FOR FORMING PASTRY CUPS
Filed March 24, 1930    5 Sheets-Sheet 3

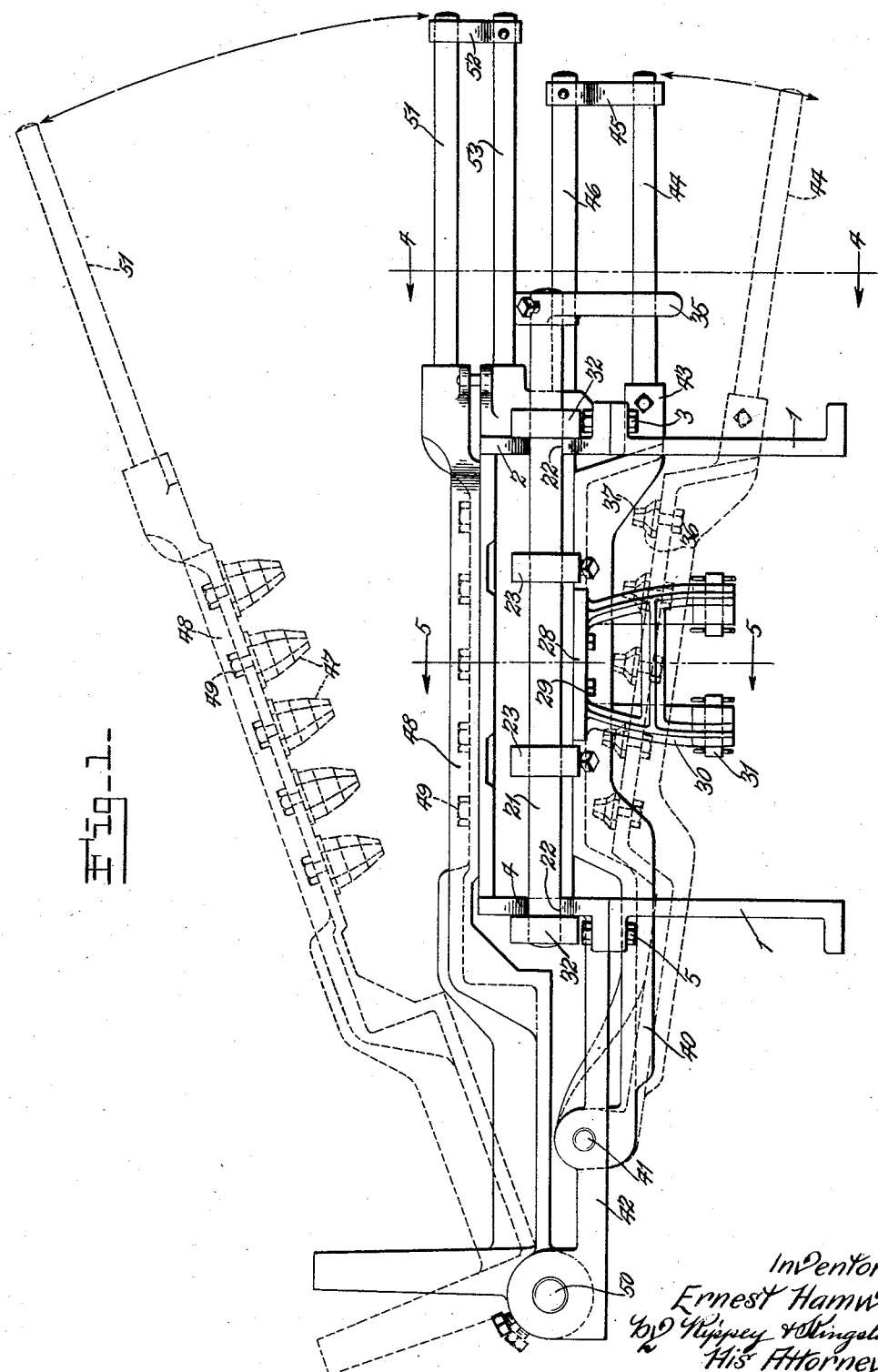

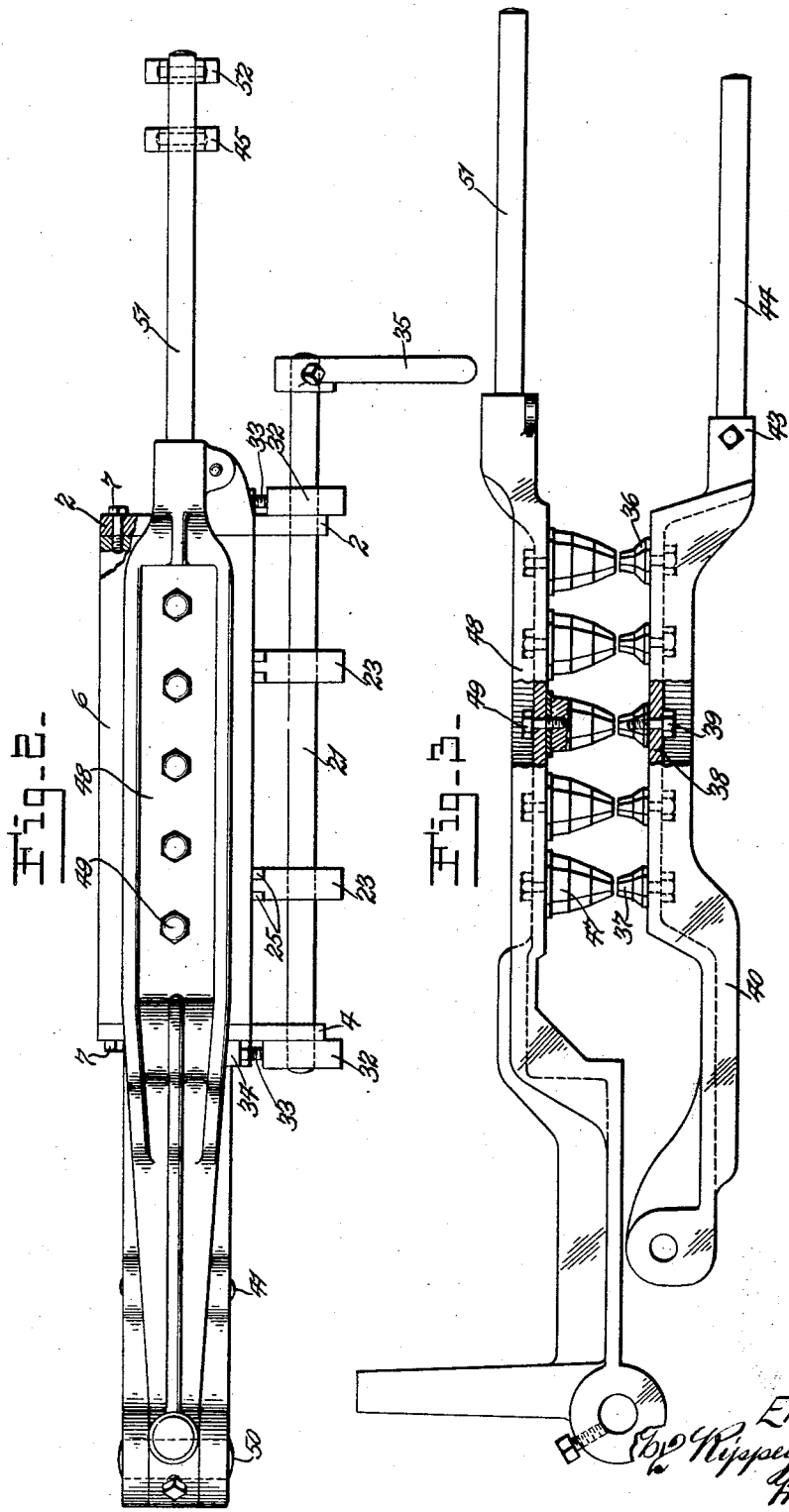

Inventor.
Ernest Hamwi,
by Kipsey & Kingsland.
His Attorneys.

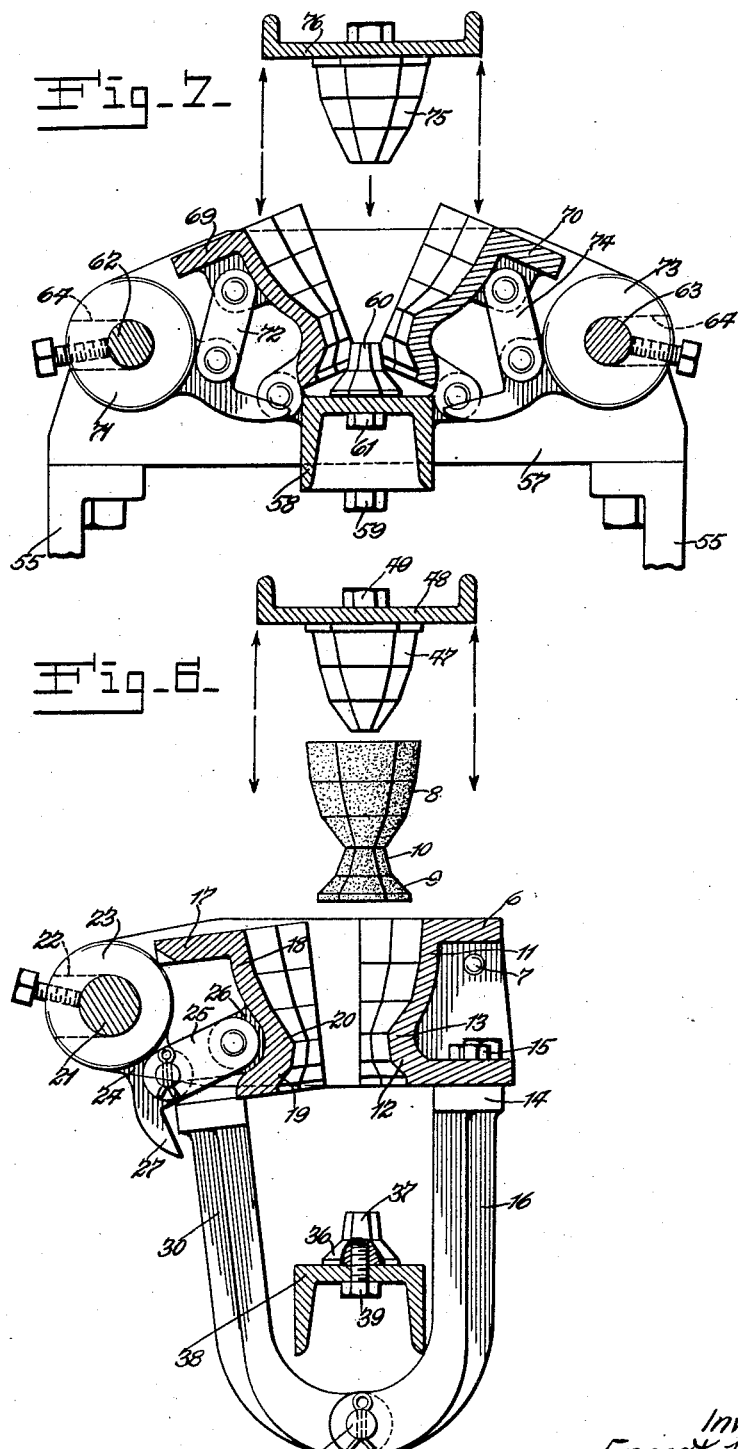

June 16, 1931.  E. HAMWI  1,809,848
MACHINE FOR FORMING PASTRY CUPS
Filed March 24, 1930  5 Sheets-Sheet 5
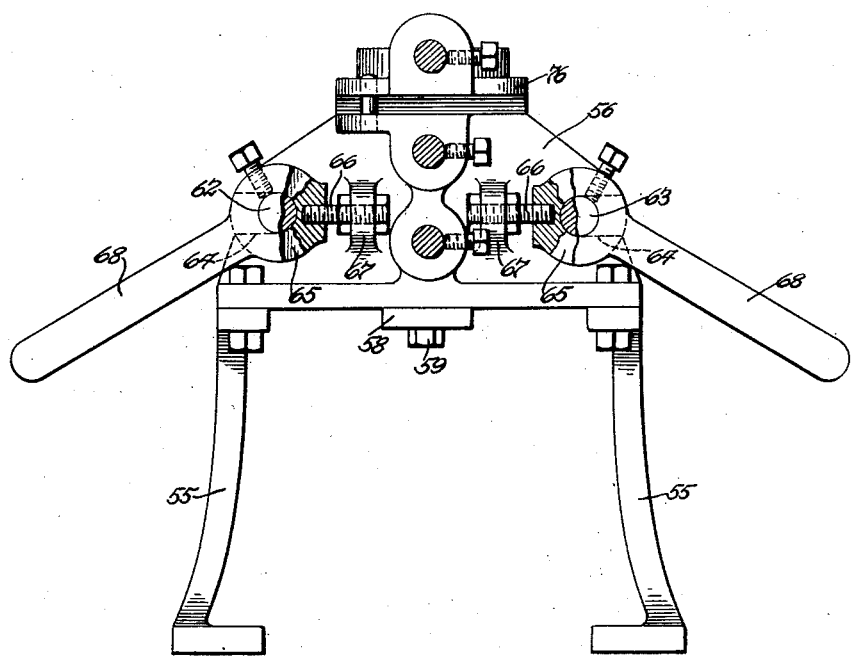
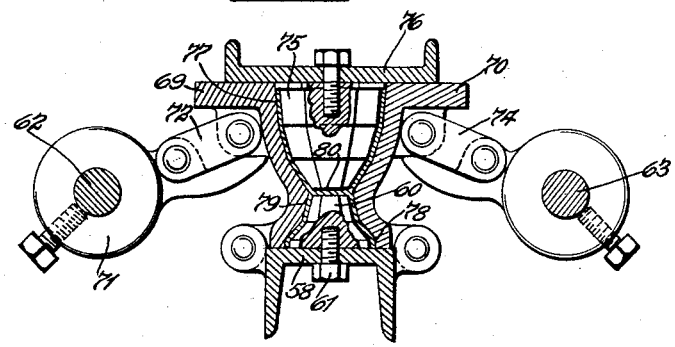
Inventor:
Ernest Hamwi,
by Rippey & Kingsland
His Attorneys.

Patented June 16, 1931

1,809,848

UNITED STATES PATENT OFFICE

ERNEST HAMWI, OF ST. LOUIS, MISSOURI

MACHINE FOR FORMING PASTRY CUPS

Application filed March 24, 1930. Serial No. 438,373.

This invention relates to machines for use in forming pastry cups.

An object of the invention is to provide a machine for forming hollow pastry cups having reduced stems connecting the flaring cup bases with the flaring cup bowls, comprising mold members arranged in cooperative relationship to form the exterior of the cups with the flaring bases and bowls and reduced connecting stems, in combination with mold elements for shaping the bases so that they are hollow, and other mold elements for forming the hollow bowls.

Another object of the invention is to provide means for supporting the various mold elements and mold members so that they may be brought into cooperative relationship to mold the cups, and separated to eject the finished cups therefrom.

Other objects will appear from the following description, reference being made to the accompanying drawings, in which—

Fig. 1 is a side elevation of my improved machine.

Fig. 2 is a plan view, the lower portion of the frames being omitted.

Fig. 3 is a side elevation of the mold core members.

Fig. 6 is a sectional view similar to Fig. 5 showing the mold members moved apart and showing one of the cups produced by this machine.

Fig. 7 is a cross-sectional view showing a modification of the machine with the mold members in open position.

Fig. 8 is a sectional view of the modified form of the machine and may be considered as taken on a line such as 4—4 of Fig. 1.

Fig. 9 is a cross-sectional view of the modified machine on a line such as 5—5 of Fig. 1.

Figure 4:
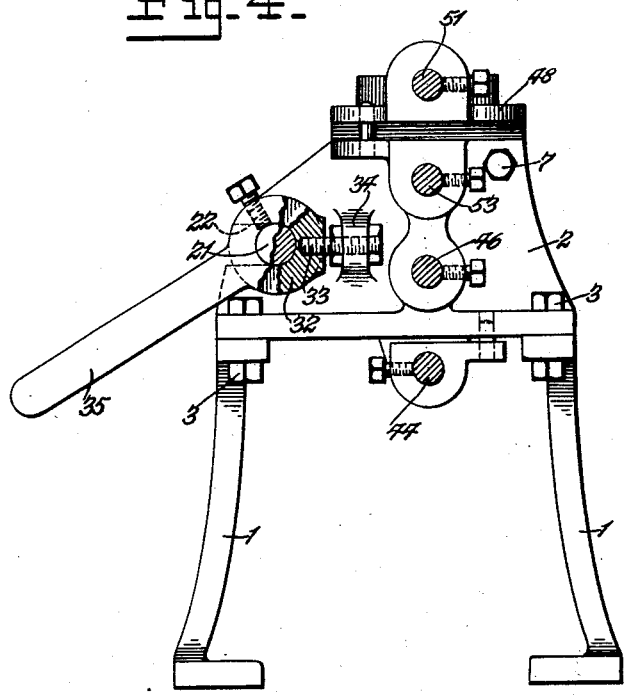
Fig. 4 is a sectional view on the line 4—4 of Fig. 1.

The machine is supported by a number of legs 1. These legs are arranged in pairs with one pair of legs near each end of the machine. On the pair of legs 1 near one end of the machine, a frame member 2 is attached by bolts 3. A frame member 4 is attached to the pair of legs 1 at the opposite end of the machine by bolts 5.

A mold side member 6 is attached to the frame members 2 and 4 by bolts 7 (Figs. 2 and 4) and is shaped to provide a series of half-mold walls for the cups. These half-mold walls are shaped to cooperate with another mold member so as to form cups like that shown in Fig. 6, comprising a flaring bowl 8 and a downwardly flaring base 9 connected by a stem 10 of reduced diameter. The bowl forming portions 11 of these half-molds are connected with the base forming portions 12 by inwardly extended portions 13.

A bracket 14 is attached to the mold member 6 by bolts 15, and has arms 16 extending downwardly and curving inwardly.

A cooperating mold member 17 is shaped to provide a series of cooperating half-molds, each having a bowl forming portion 18, a base forming portion 19, and a connecting portion 20. When these two mold members are brought together in edgewise abutting contact, they form a series of hollow molds in which the cups may be formed with upwardly flaring bowls 8 and downwardly flaring bases 9 connected by stems 10 of reduced diameter. The mold member 17 is not rigidly attached to the frames 2 and 4, but is movable laterally between said frames toward and from the mold member 6.

Figure 5:
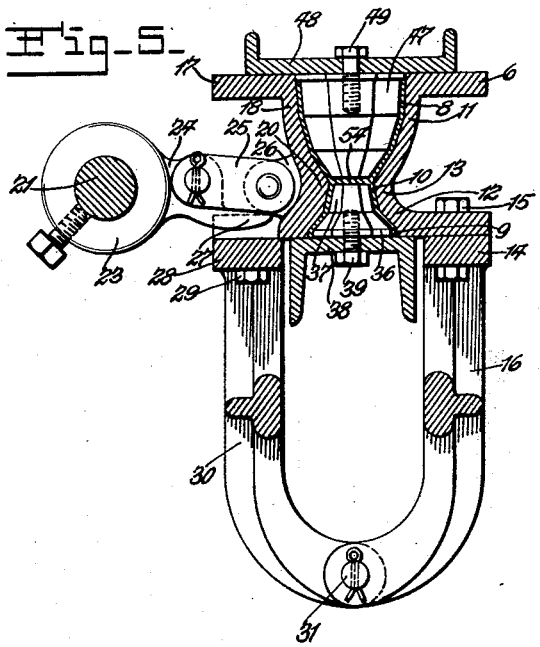
Fig. 5 is a sectional view on the line 5—5 of Fig. 1.

A shaft 21 is mounted for rocking movements in slots 22 in the outer sides of the frames 2 and 4. These slots constitute bearings for the shaft 21. The shaft 21 has attached thereto a pair of collars 23, each having an inwardly extended ear 24. A pair of links 25 have their outer ends pivoted to each ear 24 and their inner ends pivoted to ears 26 in connection with the mold member 17. Each ear 24 is extended to provide an arm 27 adapted to abut against the undersides of the ears 26 (Fig. 5) to limit turning movement of the shaft 21 in one direction. The mold member 17 has a bracket 28 attached thereto by bolts 29 and provided with downwardly and inwardly extended arms 30 connected with the ends of the arms 16 by pivots 31.

A pair of collars 32 are mounted on the shaft 21. Screws 33 project through ears 34 formed on the frame members 2 and 4 and are screwed into the collars 32. Thus, by manipulation of the screws 33, the shaft 21 may be adjusted in proper position for operation of the mold member 17. A handle 35 is attached to one end of the shaft 21, whereby said shaft may be rocked. It is now clear that by raising the handle 35, the shaft 21 may be turned to swing the ears 24 downwardly and outwardly, and thereby cause the links 25 to move the mold member 17 outwardly away from the mold member 6 (Fig. 6). And turning of the shaft 21 in the opposite direction will move the mold member 17 into abutting contact with the mold member 6 so as to close the mold for use.

Mold members for hollowing the bases 9 of the cups comprise upwardly tapered bodies 36 having upwardly extended tapered portions 37 (Fig. 6). These mold members are attached to a bar 38 by screws 39. The bar 38 has at one end a downwardly and longitudinally extended portion 40 (Fig. 1) mounted on a pivot 41. The pivot 41 is carried by a longitudinally projecting portion 42 of the frame 4. The opposite end of the bar 38 has a downwardly and longitudinally extended sleeve 43 in which is secured one end of a handle 44 adapted to be engaged by a loop 45 carried by an arm 46 rigidly secured to the frame 2. When the arm 44 is engaged with the loop 45, the bar 38 is held seated against the lower edges of the mold members 6 and 17 and, in such position of the bar 38, the mold elements 36 project upwardly into the base forming portions of the molds. The mold elements 36 are spaced concentrically from the base forming portions of the molds so as to permit the cup forming material to fill said spaces and thereby form the hollow bases of the cups.

The mold members 47 for forming the hollow bowls of the cups are attached to a plate 48 by screws 49. The plate 48 has one end mounted on a pivot 50 (Fig. 1) and the opposite end provided with a handle 51 for engagement with a loop 52 on the forward end of a bar 53 projecting rigidly from the frame 2. The mold core members 47 are attached to the plate 48 in a relationship so that, when the plate 48 is seated upon the mold members 6 and 17 (Fig. 5), said mold core members 47 are extended downwardly and concentrically within the bowl forming portions of the molds. Thus, the mold devices will form cups comprising the upwardly flaring bowls 8 and the downwardly flaring bases 9 connected by stems 10 of reduced diameter, and a bottom wall 54 (Fig. 5) at the bottom of the bowl and at the upper end of the stem. Accordingly, both the bowl and the base of each cup are hollow and the bottom wall 54 is at the bottom of the cup and at the upper end of the stem.

In using this mold to form the cups, the mold member 17 is moved and held against the mold member 6, and the bar 38 is moved and held against the lower edges of the mold members 6 and 17 to close the bottoms of the molds. The proper amount of material to form the cups is then poured into the molds, after which the plate 48 is moved from the upper position shown in dotted lines in Fig. 1 to its lower position upon the upper edges of the mold members 6 and 17. This projects the mold core members 47 concentrically into the cup forming molds and shapes the material into the form shown and described. After the cups have been baked, the molds are opened and the cups removed. The molds may be opened by releasing and lowering the bar 38 and by turning the shaft 21 in a direction to move the mold member 17 away from the mold member 6 and by raising the plate 48. The cups may then be lifted from the molds.

The machine of modified construction shown in Figs. 7, 8 and 9 comprises a pair of legs 55 at each end of the machine corresponding to the legs 1, and frame members 56 and 57 attached to said pairs of legs 55. A bar 58 is attached to the lower sides of the frame members 56 and 57 by bolts 59. Mold core members 60 for the bases of the cups are attached to the bar 58 by bolts 61.

A pair of shafts 62 and 63 are mounted for rocking movements in bearing slots 64 in the frame members 56 and 57, and have thereon collars 65 engaged by screws 66 supported in ears 67 projecting from the frame members 56 and 57. The shafts 62 and 63 are independently rockable by levers 68 attached to said shafts, respectively.

The shaft 62 is connected with a mold member 69 shaped to provide molds for forming the cups and arranged to cooperate with a similar mold member 70 connected with the shaft 63. The mold member 69 is connected with collars 71 on the shaft 62 by links 72, and the mold member 70 is connected with collars 73 on the shaft 63 by links 74. Rocking of the shafts 62 and 63 in one direction moves the mold members 69 and 70 into abutting contact to form the hollow molds into the bases of which the cores 68 extend. The bowls of the cups are formed by mold core members 75 attached to a bar 76 movable to and from position upon the mold members 69 and 70.

This modified form of machine is used by closing the mold members 69 and 70 against each other and pouring the appropriate amount of material into the respective molds, and then lowering the bar 76 to extend the mold core members 75 concentrically into the bowls of the molds. This will produce cups having upwardly flaring bowls 77 and downwardly flaring hollow bases 78 connected with the bowls by stems 79 of reduced diameter, and a bottom wall 80 at the bottom of each cup. After the cups have been baked, they are rendered accessible for removal from the molds by raising the bar 76 and swinging the mold members 69 and 70 laterally away from each other.

It is now clear that my invention obtains all of its intended objects and purposes quite efficiently, and that the mold members may be relatively adjusted for accurate work by proper manipulation and adjustment of the screws 33 and 66. The cups having elevated bottoms and hollow bases may be formed rapidly by these molds, and baked and removed without likelihood of damage. The construction and arrangement of the mechanism of the machine may be varied otherwise than as specifically mentioned without departure from the nature and principle of the invention. I do not restrict myself unessentially, but what I claim is:—

1. A machine of the character described, comprising two side members having opposite recesses in their adjacent sides forming mold cavities, means for supporting one of said side members in a stationary position while the other side member is moved, a rock shaft, connections from said rock shaft for moving said other side member from sidewise abutting contact with the stationary side member to release the articles from the mold cavities, cores projecting upwardly into the lower ends of the mold cavities and spaced from the walls thereof, and cores projecting downwardly into the upper ends of the mold cavities and spaced from the walls thereof and having their lower ends spaced upwardly from said first named cores.

2. A machine of the character described, comprising a pair of cooperating mold members having opposing recesses in their adjacent sides forming mold cavities flaring upwardly and downwardly toward their upper and lower ends respectively, a rock shaft supported parallel with and beyond the outer side of one of said members, means for rocking said shaft, links connecting said shaft with the adjacent mold member for moving said mold member toward and from the other mold member, core elements extending downwardly into said mold cavities and spaced from the walls thereof, and core elements projecting upwardly into the lower ends of said mold cavities and spaced from the walls thereof and having their upper ends spaced below said first cores.

3. A machine of the character described, comprising a pair of cooperating mold members having recesses in their adjacent sides forming mold cavities, a rock shaft, bearings for said rock shaft, means for adjusting said bearings toward and away from one of said mold members, means for rocking said shaft, and links pivotally connecting said shaft with said one mold member and operating to move said mold member to and from cooperative position with the other mold member.

4. A machine of the character described, comprising a pair of cooperating mold members having recesses in their adjacent sides forming mold cavities, a rock shaft, bearings for said rock shaft, means for adjusting said bearings toward and away from one of said mold members, means for rocking said shaft, links pivotally connecting said shaft with said one mold member and operating to move said mold member to and from cooperative position with the other mold member, and cores extending downwardly into said mold cavities and spaced from the walls thereof.

5. A machine of the character described, comprising two opposing mold members having recesses in their adjacent sides forming mold cavities having their upper portions flaring upwardly and their lower portions flaring downwardly, cores extending downwardly into the upwardly flaring portions of said mold cavities, cores extending upwardly into the downwardly flaring portions of said mold cavities and cooperating with said first cores to form cup bottom walls, and means for moving one of said mold members to abutting contact with the other while said other mold member remains stationary to form said mold cavities and for moving said one mold member away from the other to release the articles formed in said mold cavities.

6. A machine of the character described, comprising a mold member having recesses in one side thereof, a cooperating mold member having recesses opposite said recesses in said first mold member and cooperating therewith to form mold cavities having their upper ends flaring upwardly and their lower ends flaring downwardly, core elements extending upwardly into the downwardly flaring lower ends of said mold cavities, an upper series of core elements, means for moving said upper series of core elements to positions extending downwardly into the upwardly flaring portions of said mold cavities, a rock shaft, stationary bearings supporting said rock shaft and links pivotally connecting said rock shaft with said second mold member for moving said second mold member to and from position to cooperate with said first mold member.

7. A machine for forming pastry cups, comprising a pair of mold members having recesses in their adjacent sides forming mold cavities, a rock shaft, bearings in which said rock shaft is mounted for rocking movements, collars on said rock shaft, elements engaging said collars for holding said shaft in adjusted positions on said bearings, and links connecting said rock shaft with one of said mold members.

8. A machine for forming pastry cups, comprising a pair of mold members having recesses in their adjacent sides forming mold cavities, a rock shaft, bearings in which said rock shaft is mounted for rocking movements, collars on said rock shaft, elements engaging said collars for holding said shaft in adjusted positions on said bearings, links connecting said rock shaft with one of said mold members, and core elements extending upwardly into the lower ends of said mold cavities and spaced from the walls thereof.

9. A machine for forming pastry cups, comprising a pair of mold members having recesses in their adjacent sides forming mold cavities, a rock shaft, bearings in which said rock shaft is mounted for rocking movements, collars on said rock shaft, elements engaging said collars for holding said shaft in adjusted positions on said bearings, links connecting said rock shaft with one of said mold members, core elements extending upwardly into the lower ends of said mold cavities and spaced from the walls thereof, and additional core elements extending downwardly into said mold cavities and spaced from the walls thereof and having their lower ends spaced from said first core elements.

10. A machine for forming pastry cups, comprising a pair of rigid frames each having a horizontal bearing slot therein, a rock shaft mounted for rotation in said bearing slots, collars on said rock shaft, elements connected with said frames and engaging said collars for holding said shaft in adjusted positions in said bearing slots, a pair of mold members having recesses in their adjacent sides forming mold cavities, and links connecting said rock shaft with one of said mold members for moving said one mold member to and from the other mold member.

11. A machine for forming pastry cups, comprising a pair of mold members having recesses in their adjacent sides forming mold cavities, a pair of rigid frames having horizontal bearing slots therein, means rigidly connecting one of said mold members with said frames and leaving the other mold member movable, a rock shaft journalled for rocking movements in said bearing slots, links connecting said rock shaft with said movable mold member for moving said movable mold member toward and from said rigid mold member, collars in which said rock shaft is rotative, and elements engaging said frames and said collars and holding said rock shaft in adjusted positions in said bearing slots.

12. A machine for forming pastry cups, comprising a pair of mold members having recesses in their adjacent sides forming mold cavities, a pair of rigid frames having horizontal bearing slots therein, means rigidly connecting one of said mold members with said frames and leaving the other mold member movable, a rock shaft journalled for rocking movements in said bearing slots, links connecting said rock shaft with said movable mold member for moving said movable mold member toward and from said rigid mold member, collars in which said rock shaft is rotative, elements engaging said frames and said collars and holding said rock shaft in adjusted positions in said bearing slots, means forming end walls as the upper and lower ends of said mold cavities, and core elements extending downwardly into said mold cavities and spaced from the walls thereof.

13. A machine of the character described, comprising a pair of end frames, a mold member rigid with said frames and having recesses in one side, a movable mold member located between said frames and having recesses opposite said recesses in said rigid mold member and cooperating therewith to form mold cavities, a laterally movable rock shaft supported by said end frames adjacent to said movable mold member, links connecting said rock shaft with said movable mold member for moving said mold member to and from position to cooperate with said first mold member, and means holding said shaft in different lateral adjusted positions with respect to said movable mold member.

14. A machine of the character described comprising a pair of end frames, a mold member rigid with said frames and having recesses in one side, a movable mold member located between said frames and having recesses opposite said recesses in said rigid mold member and cooperating therewith to form mold cavities, a laterally movable rock shaft supported by said end frames adjacent to said movable mold member, links connecting said rock shaft with said movable mold member for moving said mold member to and from position to cooperate with said first mold member, means holding said shaft in different lateral adjusted positions with respect to said movable mold member, and core elements arranged to extend into said mold cavities to form articles having hollow upper and lower ends.

15. A machine of the character described, comprising a pair of movable mold members having recesses in their adjacent sides forming mold cavities, a bottom mold member closing the lower ends of said mold cavities, a rock shaft parallel with each of said mold members, links connecting said rock shafts with the respective mold members, and means for rocking said shafts to move said mold members to and from cooperative position.

16. A machine for forming pastry cups comprising two opposite side members having opposite recesses forming mold cavities, a rock shaft for each of said side members, bearings for said shafts supported at a distance laterally from said members respectively, means for rocking said shafts respectively, elements connecting said respective shafts with the corresponding side member for moving said side member toward and from said other side member when one of said shafts is rocked and while the other shaft remains stationary, cores movable downwardly into the mold cavities to shape the material into the form of cups, and means for withdrawing said cores from said mold cavities.

17. A machine of the character described comprising a movable mold member having recesses in one side, a cooperating mold member having opposing recesses cooperating with said recesses in said movable mold member to form mold cavities, a support on which said second mold member is rigidly mounted, a shaft extending parallel with said movable mold member, bearings for said shaft, devices operable to space said bearings in proper relation to said movable mold member, means for rocking said shaft, and links pivotally connecting said shaft with said movable mold member for moving said movable mold member toward and away from said rigid mold member.

18. A machine of the character described comprising a movable mold member having recesses in one side, a cooperating mold member having opposing recesses cooperating with said recesses in said movable mold member to form mold cavities, a support on which said second mold member is rigidly mounted, a shaft extending parallel with said movable mold member, bearings for said shaft, devices operable to space said bearings in proper relation to said movable mold member, means for rocking said shaft, links pivotally connecting said shaft with said movable mold member for moving said movable mold member toward and away from said rigid mold member, and series of core elements extending into said mold cavities forming articles having hollow lower and upper ends and having bottom walls intermediate of their upper and lower ends.

19. A machine of the character described comprising a pair of movable mold members having recesses in their adjacent sides forming mold cavities, a movable bottom mold member closing the lower end of said mold cavities, cores projecting upwardly into said mold cavities from said bottom mold member, an element supporting said bottom mold member for vertical swinging movements to and from position to close the lower end of said mold cavities, means cooperating with said element to hold said bottom mold member in closed position, cores movable to position to extend downwardly into the upper ends of said mold cavities to positions in which their lower ends are spaced from the upper ends of said first named cores, mechanism for moving one of said mold members toward and from the other, and means for supporting said bottom mold member in position in which said cores in connection therewith extend upwardly into said mold cavities.

ERNEST HAMWI.